United States Patent [19]

Strien

[11] 4,236,751
[45] Dec. 2, 1980

[54] VEHICLE SAFETY SEAT BOTTOM

[75] Inventor: Werner Strien, Stuttgart-Heumaden, Fed. Rep. of Germany

[73] Assignee: Recaro GmbH & Co., Kirchheim, Fed. Rep. of Germany

[21] Appl. No.: 933,951

[22] Filed: Aug. 15, 1978

[30] Foreign Application Priority Data

Sep. 10, 1977 [DE] Fed. Rep. of Germany ... 7728111[U]

[51] Int. Cl.² .............................................. B60R 21/10
[52] U.S. Cl. .................................... 297/216; 297/458
[58] Field of Search ................ 297/452, 458, 216, 219

[56] References Cited

U.S. PATENT DOCUMENTS

| 2,047,616 | 7/1936 | Church | 297/458 X |
| 2,833,339 | 5/1958 | Liljengren | 297/216 |
| 3,298,741 | 1/1967 | Lepard et al. | 297/452 X |
| 3,311,410 | 3/1967 | Hill | 297/458 X |
| 3,596,990 | 8/1971 | Gottfried | 297/284 |
| 3,792,897 | 2/1974 | Alson | 297/284 |

FOREIGN PATENT DOCUMENTS

| 1173209 | 7/1967 | United Kingdom | 297/284 |
| 1348873 | 3/1974 | United Kingdom | 297/216 |

Primary Examiner—Francis K. Zugel
Attorney, Agent, or Firm—Wigman & Cohen

[57] ABSTRACT

A safety seat bottom for a vehicle is disclosed. The seat bottom comprises a seat bottom upholstery support or frame upon which is arranged seat bottom upholstery. A shaped, transversely arranged support body is secured to the upper side of the upholstery support and projects upwardly beneath the seat bottom upholstery for preventing the seat user from sliding forwardly along the seat bottom during an accident.

8 Claims, 2 Drawing Figures

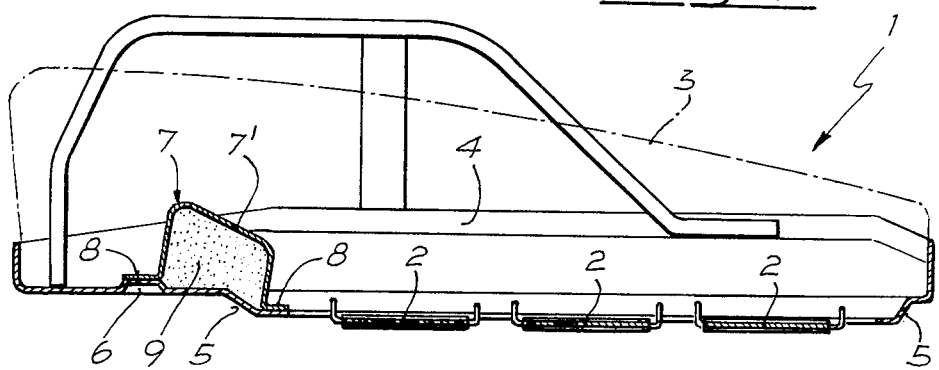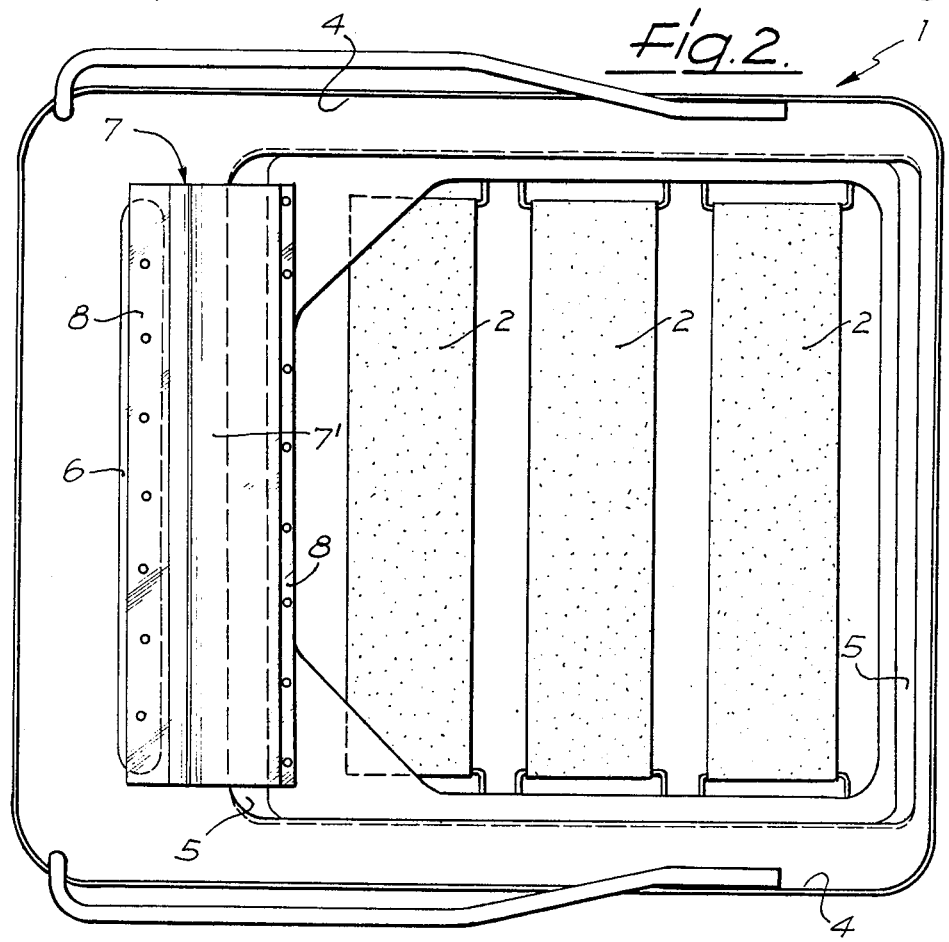

VEHICLE SAFETY SEAT BOTTOM

BACKGROUND OF THE INVENTION

The present invention relates to a vehicle seat having upholstery arranged on an upholstery support of the bottom portion of the seat.

Generally, in known vehicle seats the upholstery arranged on the upholstery support of the bottom portion of the seat is arranged in such a manner that in the front half of such bottom portion, that is, the portion at which the thighs of the user are supported, the seat is capable of being compressed to a relatively great degree, but is, in fact, compressed by the load exerted by the thighs to only a relatively small percentage of the total compression. In an accident, the user will often slide at least somewhat forwardly in the seat, and it can, therefore, happen that the upholstery in the front half of the seat may yield to such a degree that the user will slide through beneath the safety belt and be strangled thereby.

SUMMARY AND OBJECTS OF THE INVENTION

A primary objective of this invention, therefore, is to provide a vehicle seat which, to as great an extent as possible, prevents the user from sliding beneath the safety belt during an accident. This objective is attained with a vehicle seat of the above-mentioned type, in that the front half of the upholstery support on the side thereof supporting the upholstery has a shaped support body which projects above such supporting side and extends transversely of the seat.

This type of support body is not visually or otherwise apparent to the user during normal loading of the seat, even if it has a relatively large height because, under normal loading of the seat, the upholstery in the front half is not particularly heavily loaded. If, however, the upholstery in the front half of the seat is greatly compressed as the user slides forward, the support body operates as a crosswise, ledgelike elevation or stop beyond which the user of the seat cannot slide, at least if he is buckled in by a seat harness which includes a lap belt. Even if the safety harness has no lap belt, the support body decreases the danger that the user will slide forward out of the seat during an accident, because such support body forms a hump or elevation which prevents the user from sliding forward even in this case. A further advantage of the seat support is the concomitant stiffening of the upholstery support. Especially advantageous is an arrangement wherein the said body is located approximately in the center of the front half of the upholstery support, because, on the one hand, the compressibility of the front edge of the upholstery is not limited by the support body and, on the other hand, the user cannot slide forward to any great extent before the support body becomes effective.

In a preferred exemplary embodiment, the support body is a hollow sheet metal element. The cost of this type of sheet metal element is small, and is independent of whether it is produced separate from the upholstery support and welded thereto or whether it is formed in one piece with the upholstery support such as by deep drawing of the upholstery support. In addition, it is also simple to form a sheet metal element in such a manner that it is irreversibly deformable or crushable under a certain load so as to simultaneously absorb energy. Shape, wall thickness, openings or breaks in the structure and the like can determine the load under which the support body begins to be deformed. This type of shock-absorbing effect of the support body, which obviously can also be attained by other means, is desirable in view of the high loads to which the body of the seat user is subjected when he is forced against the support body. If the support body is hollow, it can be filled with a shock-absorbing material, such as foam, to increase the shock-absorbing effect.

In order to increase the support effect of the support body, in one preferred exemplary embodiment, the upper side thereof which is directed away from the upholstery support is rearwardly inclined. The user is thus first forced against this upper side rather than against the edge of the support body.

BRIEF DESCRIPTION OF THE DRAWINGS

The invention is described in greater detail below with the aid of the exemplary embodiment shown in the drawings, wherein:

FIG. 1 is a longitudinal section through the seat bottom portion of the exemplary embodiment; and FIG. 2 is a top view of the exemplary embodiment with the upholstery of the seat bottom portion removed.

DETAILED DESCRIPTION OF A PREFERRED EMBODIMENT

The bottom portion of a vehicle seat, as shown especially in FIG. 2, includes an upholstery support formed by a sheet metal frame 1, across which elastically resilient belts 2 are stretched. The belts 2 form a suspension for the upholstery 3 which lies thereon and on the edge zones of the frame. The frame 1, at which the back rest of the seat (not shown) is pivoted, is rigidified by a raised edge or rim 4, by a step 5 which extends along the inner border edge of a central opening in the frame, as well as a reinforcing cross-rib 6 in the widened front portion of the frame.

As shown especially in FIG. 1, a shaped support body 7 having two outwardly bent, strip-like flanges 8, lies on the reinforcing rib 6 and on the edge strip which is parallel thereto and forms the forward edge of the central opening spanned by the belts 2. The two flanges 8 are rigidly connected with the frame, and may be, for example, welded thereto. The support body thereby lies approximately in the center of the front half of the frame.

The support body 7, which has approximately the same length as the belts 2, is formed of bent sheet metal and has, in addition to the flanges 8, a generally U-shaped cross-sectional profile. The top of the body or yoke element 7', to which both sides of the body are joined with rounded corners, is flat and rearwardly inclined. This inclined position is attained despite the approximately equal lengths of the two sides in that the flange which lies on the reinforcing rib 6 is higher than the other flange by the difference between the height of the step 5 and the height of the reinforcing rib 6. The inclination of the yoke element 7' with respect to the plane formed by the frame is approximately 30°. In addition, the height of the support body 7 is chosen in such a manner that the plane defined by the yoke element 7' interacts with the forwardmost belt 2. In this manner, in an accident during which the user of the seat slides forward, thereby pressing downward and increasing the load particularly on the forwardly disposed belt 2, the upholstery supported on the upholstery support 1 in the area between the forwardmost belt 2 and the support body 7 is compressed to an angle of about 30°, which generally is sufficient to prevent the user of the seat from sliding any farther forward. If the seat user is buckled in by a safety harness which includes a lap belt, then this is generally sufficient to prevent the user from sliding forward beyond the seat even in serious accidents.

The strength of the sheet metal, of which the support body 7 is manufactured, can be chosen so that the support body irreversibly deforms when the force with which a seat user bears against the support body exceeds a predetermined value, for example a value which could result in injury to the seat user. To vary such predetermined value, the support body can also be provided with openings, breaks or the like, which weaken it by the required amount. This irreversible deformation capability of the support body 7 provides a shock-absorbing effect, which can be increased by filling the support body with a shock-absorbing material such as foam 9.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. In a vehicle seat having a bottom upholstery support and a seat bottom upholstery arranged on said bottom upholstery support upon which a seat user is adapted to sit, the improvement comprising:
   support means secured transversely of said bottom upholstery support and projecting upwardly therefrom beneath said seat bottom upholstery, for preventing the user from sliding forwardly on the seat bottom when the vehicle is sharply decelerated;
   wherein said bottom upholstery support includes front and rear halves, said support body means being arranged substantially centrally of said front half;
   said support means having substantially vertically oriented forwardly and rearwardly facing surfaces, said forwardly facing surface being spaced from the front edge of the base of the bottom upholstery support; and
   said bottom upholstery support further includes a step over which said support body means is secured and from which said support body means projects.

2. The improvement according to claim 1, wherein said support body means comprises a hollow sheet metal element.

3. The improvement according to claim 1, wherein said support body means is integrally formed with said upholstery support.

4. The improvement according to claim 1, wherein said support body means is filled with a shock-absorbing material.

5. In a vehicle seat having a bottom upholstery support and a seat bottom upholstery arranged on said bottom upholstery support upon which a seat user is adapted to sit, the improvement comprising:
   support means secured transversely of said bottom upholstery support and projecting upwardly therefrom beneath said seat bottom upholstery, for preventing the user from sliding forwardly on the seat bottom when the vehicle is sharply decelerated;
   wherein said bottom upholstery support includes front and rear halves, said support body means being arranged substantially centrally of said front half;
   said body support means includes an irreversibly deformable means for absorbing energy and said body support means has substantially vertically oriented forwardly and rearwardly facing surfaces, said forwardly facing surface being spaced from the front edge of the base of the bottom upholstery support; and
   said body support means further includes an upper surface which is downwardly inclined toward the rear of said bottom upholstery support and which connects said substantially vertically oriented forwardly and rearwardly facing surfaces.

6. The improvement according to claim 5, wherein said support body means comprises a hollow sheet metal element.

7. The improvement according to claim 5, wherein said support body means is integrally formed with said upholstery support.

8. The improvement according to claim 5, wherein said support body means is filled with a shock-absorbing material.

* * * * *

UNITED STATES PATENT AND TRADEMARK OFFICE
CERTIFICATE OF CORRECTION

PATENT NO. : 4,236,751
DATED : December 2, 1980
INVENTOR(S) : Werner Strien

It is certified that error appears in the above-identified patent and that said Letters Patent are hereby corrected as shown below:

Claim 1, column 3, lines 35 and 44, each instance, after "support", insert -- body --.

Claim 5, column 4, line 18, after "support", insert -- body --; and lines 27, 29 and 34, each instance, change "body support" to -- support body --.

Signed and Sealed this

Tenth Day of March 1981

[SEAL]

Attest:

RENE D. TEGTMEYER

Attesting Officer     Acting Commissioner of Patents and Trademarks